United States Patent
Varikat et al.

(10) Patent No.: US 7,443,938 B2
(45) Date of Patent: Oct. 28, 2008

(54) METHOD AND SYSTEM FOR SYNCHRONIZATION BETWEEN TRANSMITTER AND RECEIVER IN A COMMUNICATION SYSTEM

(75) Inventors: Anubala S. Varikat, Bangalore (IN); Satish Tembad, Bangalore (IN)

(73) Assignee: Sasken Communication Technologies Ltd., Bangalore (IN)

( * ) Notice: Subject to any disclaimer, the term of this patent is extended or adjusted under 35 U.S.C. 154(b) by 594 days.

(21) Appl. No.: 11/031,017

(22) Filed: Jan. 7, 2005

(65) Prior Publication Data

US 2006/0153322 A1   Jul. 13, 2006

(51) Int. Cl.
*H04L 7/00* (2006.01)

(52) U.S. Cl. .................. 375/354; 375/142; 375/147; 375/150; 375/340; 375/343; 327/141; 370/509; 455/503

(58) Field of Classification Search .............. 375/142, 375/145, 146, 147, 149, 150, 316, 343, 354, 375/355; 455/130; 370/324; 327/141
See application file for complete search history.

(56) References Cited

U.S. PATENT DOCUMENTS

| | | | |
|---|---|---|---|
| 5,907,558 A | 5/1999 | Watanabe | |
| 6,122,327 A | 9/2000 | Watanabe et al. | |
| 6,885,693 B1 * | 4/2005 | Burton | 375/142 |
| 7,058,151 B1 * | 6/2006 | Kim | 375/355 |
| 2004/0014480 A1 | 1/2004 | Liu et al. | |

* cited by examiner

*Primary Examiner*—David C Payne
*Assistant Examiner*—Leon Flores
(74) *Attorney, Agent, or Firm*—William L. Botjer

(57) ABSTRACT

A method and system for synchronization between a transmitter and a receiver in a communication system is provided. The receiver receives a plurality of signals from the transmitter. According to this method, a frequency burst is detected in the received signal at the receiver. The detected frequency burst is then validated on the basis of a synchronization burst in the received signal. Finally, the frequency and timing information present in the received signal is acquired for synchronization with the transmitter. The frequency and timing information is acquired on the basis of the validated frequency burst.

11 Claims, 7 Drawing Sheets

METHOD AND SYSTEM FOR SYNCHRONIZATION BETWEEN TRANSMITTER AND RECEIVER IN A COMMUNICATION SYSTEM

BACKGROUND

This invention relates to the field of synchronization in a communication system, and, more particularly to a method and system for synchronization between a transmitter and a receiver in a GSM communication system.

Global System for Mobile communications (GSM) is a widely used telecommunications standard. According to it, a transmitter transmits a modulated signal at particular points in time. To communicate with the transmitter, a receiver interprets a received signal for establishing timing and frequency synchronization with the transmitter. For example, when a user switches on a mobile cellular phone to communicate with a base station, the mobile phone receiver has to synchronize the timing and the frequency with the base station transmitter. The GSM system defines two channels for this purpose: a frequency control channel (FCCH) that helps in identifying the frequency of the received signal, and a synchronization channel (SCH) that helps in identifying the system timing. The FCCH broadcasts a frequency burst (FB), while the SCH broadcasts a synchronization burst (SB). The FB is detected at the receiver for frequency synchronization with the transmitter, whereas the SB is detected at the receiver for time synchronization with the transmitter.

The FB is a pattern of 148 zeros, with a sampling rate of 271 kHz, modulated according to the Gaussian minimum shift keying (GMSK) scheme. The FB is transmitted by using a radio frequency (RF) carrier. This results in a pure sinusoid, whose frequency is equal to the carrier frequency offset by one-fourth the sampling rate, i.e., 67.7 kHz. In other words, after the base band conversion, the FCCH appears as a complex sinusoid of frequency 67.7 kHz at the receiver.

However, the frequency of the received FCCH can be offset from 67.7 kHz because of one or more of the following effects. There may be frequency offsets between the transmitter and the receiver, due to imperfections or variations in either of them. There can be a Doppler effect in the environment, due to the movement of the transmitter or the receiver or other disturbances resulting in a shift in the frequency of the received RF carrier. This also causes a frequency offset in the base band signal. The value of this offset is unknown, making the detection of the FCCH or FB a complex problem.

In one of the methods relating to the detection of the FB in a received signal, the received signal is derotated by 67.7 kHz and then low-pass filtering is carried out. Derotation is defined as a process for correction of the frequency by the offset. The ratio of the output power to the input power of the filter is then computed. If it is above a certain threshold, an FB is detected in the received signal.

Some methods for the detection of the FB make use of the cross correlation between the received signal and a reference pure sinusoid at 67.7 kHz. If the value of the correlation is above a preset threshold, the FB is detected in the received signal. In one of the methods, a block of 148 samples is selected and divided into a number of smaller blocks, such that the maximum difference in the phase offset between the received signal and the reference signal over each block is less than 180°. The received signal and the reference signal are correlated separately in each of these blocks, and the values of correlation are added non-coherently. However, this non-coherent addition results in degradation in performance. Alternatively, the received signal can be correlated with a number of reference signals, with frequencies in the expected range. This method, however, becomes computationally complex for high frequency offsets. Another group of FB detection methods makes use of variants of autocorrelation, such as complex autocorrelation and correlation between the real and imaginary components of the received signal. These methods are, however, less accurate in the absence of large frequency offsets.

The conventional methods described above suffer from one or more of the following limitations. Certain methods are sensitive to frequency offsets. These methods only describe the detection of the FB for synchronization purposes. However, the synchronization process involves detection of both the FB as well as the SB. The conventional methods perform detection of the SB at a later stage. This makes synchronization a two-stage process. In the first stage, the FB is detected at the receiver for frequency synchronization with the transmitter. In the second stage, the SB is detected at the receiver for time synchronization with the transmitter. The first stage of the method ensures that the initial frequency offset in the received signal is corrected before decoding the SB. However, the process of synchronization takes a longer time, using this two-stage method. In addition, there may be cases of false detection of the FB. If this occurs, the time to achieve the synchronization increases further.

Accordingly, there is a need for a method and system that reduces the time required for synchronization. The method should also ensure that there are minimal cases of false detection of the FB. In addition, the method should provide synchronization, even under large frequency offsets.

SUMMARY

An object of the present invention is to provide a method and system for synchronization between a transmitter and a receiver in a communication system.

Another object of the present invention is to provide a method and system for achieving frequency and time synchronization simultaneously.

Another object of the present invention is to provide a method and system for achieving frequency and time synchronization simultaneously, in a short time.

Yet another object of the present invention is to provide a method and system for synchronization between a transmitter and a receiver in a communication system with large frequency offsets.

Yet another object of the present invention is to provide a method and system for synchronization between a transmitter and a receiver in a communication system with low computational complexity.

Still another object of the present invention is to provide a method and system that minimizes the false detection of frequency bursts while performing synchronization between a transmitter and a receiver in a communication system.

The objects mentioned above are achieved through the following embodiments of the invention. In an embodiment of the invention, a method for synchronization between a transmitter and a receiver in a communication system is provided, wherein the receiver receives a plurality of signals from the transmitter. The method comprises detecting a frequency burst at the receiver, validating the detected frequency burst based on a synchronization burst, and acquiring frequency and timing information based on the validated frequency burst for synchronization with the transmitter.

In another embodiment of the invention, a method for synchronization between a transmitter and a receiver in a communication system includes detecting a frequency burst at the receiver, and estimating the position of a synchronization burst based on the detected frequency burst. The synchronization burst is then validated by correlating the estimated synchronization burst with a predetermined signal. The detected frequency burst is validated, based on the validation of the synchronization burst. Finally, the frequency and timing information for synchronization with the transmitter is acquired, based on the validated frequency burst and the validated synchronization burst.

In another embodiment of the invention, a system for synchronization between a transmitter and a receiver in a communication system is provided. The system comprises means for detecting a frequency burst at the receiver, means for validating the detected frequency burst based on a synchronization burst, and means for acquiring frequency and timing information based on the validated frequency burst, for synchronization with the transmitter.

The method and system of the present invention have the advantage that both the frequency and timing information carried by the received signal are available simultaneously at the receiver. In an exemplary embodiment of the present invention, the maximum time taken to achieve frequency and time synchronization is approximately half the time required if the methods for FB detection, frequency correction and SB detection are used separately. The derotation of SB samples may also be carried out in the digital domain. This reduces the need to adjust the system timing or clock before validating the FB.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides a method, system and computer program product for synchronization between a transmitter and a receiver in a communication system, such as a GSM system.

Figure 1:
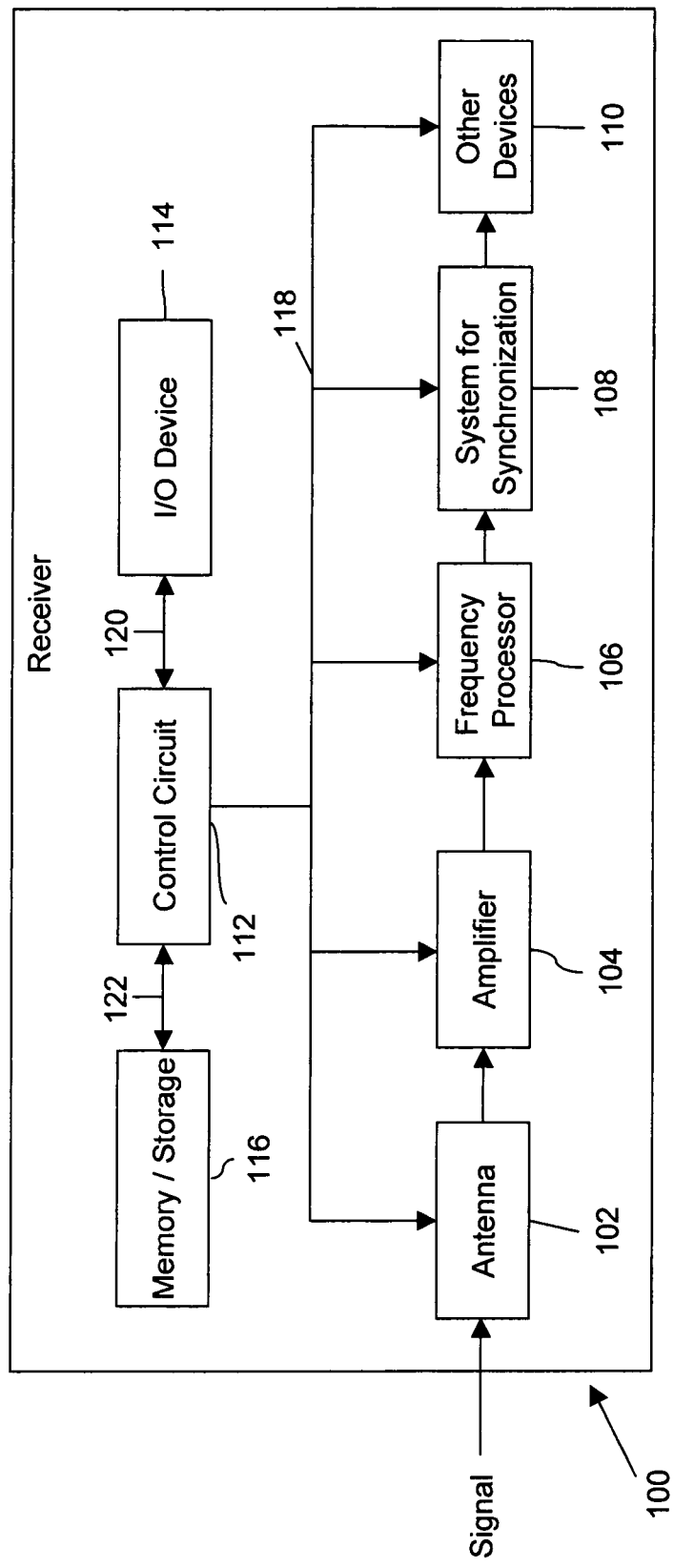
FIG. 1 is a block diagram of a receiver in a communication system, in accordance with an embodiment of the present invention.

FIG. 1 is a block diagram of a receiver 100 in a communication system that also includes a transmitter (not shown in FIG. 1). In various embodiments of the invention, receiver 100 includes a system 108 that is suitable for identifying the frequency and obtaining timing information, thereby enabling synchronization between receiver 100 and the transmitter. Receiver 100 receives signals transmitted by the transmitter. In an exemplary embodiment of the present invention, the transmitter may be a base station and receiver 100 may be a mobile device, for example in a GSM system.

A signal is received at an antenna 102 of receiver 100. An amplifier 104 amplifies the received signal to a predetermined limit. A frequency processor 106 processes the received signal. In the received signal, there is a base band signal modulated on a carrier signal. In an exemplary embodiment of the present invention, this modulation is based on the Gaussian minimum shift-keying (GMSK) scheme that is well known in the art. The base band signal has two components: an in-phase (I) or real component, and a phase quadrature (Q) or complex component.

Frequency processor 106 digitizes the I-component and Q-component of the demodulated signal. The digitized samples of I- and Q-components are processed by system 108, to obtain frequency and timing information for synchronization purposes. This enables communication between the transmitter and receiver 100. Receiver 100 may include other devices 110 for further processing of the received signal. For the sake of simplicity, other devices 110 have not been explicitly depicted in FIG. 1.

A control circuit 112 controls the functions of the various components of receiver 100. These components include, but are not limited to, antenna 102, amplifier 104, frequency processor 106, and system 108. Control circuit 112 also controls the functions of an I/O device 114. I/O device 114 may include an input device, such as a key input device, and an output device such as a display device. The key input device is used to send a request to the transmitter through control circuit 112. The transmitter then sends a signal, to be received by receiver 100 for synchronization.

Receiver 100 also includes a memory/storage 116. Memory/storage 116 may include read only memory (RAM) and random access memory (ROM). Memory/storage 116 may be connected to control unit 112 for storing and executing instructions of control unit 112. Memory/storage 116 includes one or more storage devices for storing data. A communication bus 118 connects control circuit 112 to antenna 102, amplifier 104, frequency processor 106, system 108, and other devices 110. Communication buses 120 and 122 connect control unit 112 to I/O device 114 and memory/storage 116 respectively.

Figure 2:
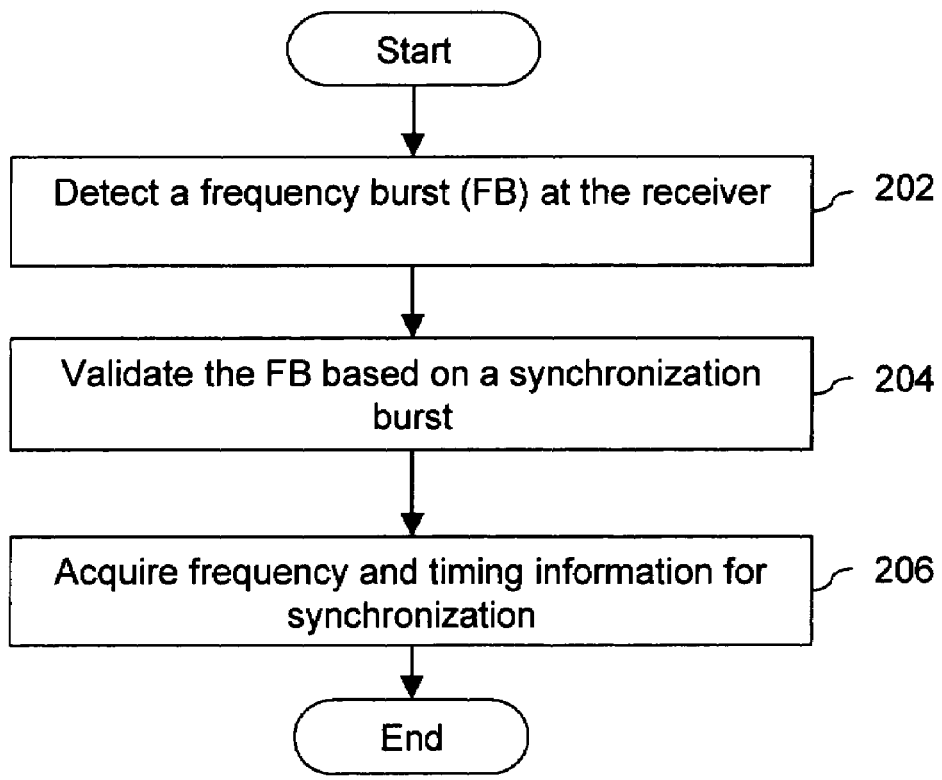
FIG. 2 is a flowchart of a method for synchronization between a transmitter and a receiver, in accordance with an embodiment of the present invention.

FIG. 2 is a flowchart depicting a method for synchronization between the transmitter and receiver 100 in a communication system, in accordance with an embodiment of the present invention. According to the method, a frequency burst (FB) or bit stream is detected at receiver 100 at step 202. The detected frequency burst is validated at step 204 on the basis of synchronization burst (SB). The frequency and timing information are then acquired at step 206 for the purpose of synchronization. This frequency acquisition is performed based on the frequency burst that is validated by using the synchronization burst, and the timing acquisition is obtained by using the synchronization burst. At steps 202 and 204, the concept of autocorrelation is used for detection and validation of the FB.

Figure 3:
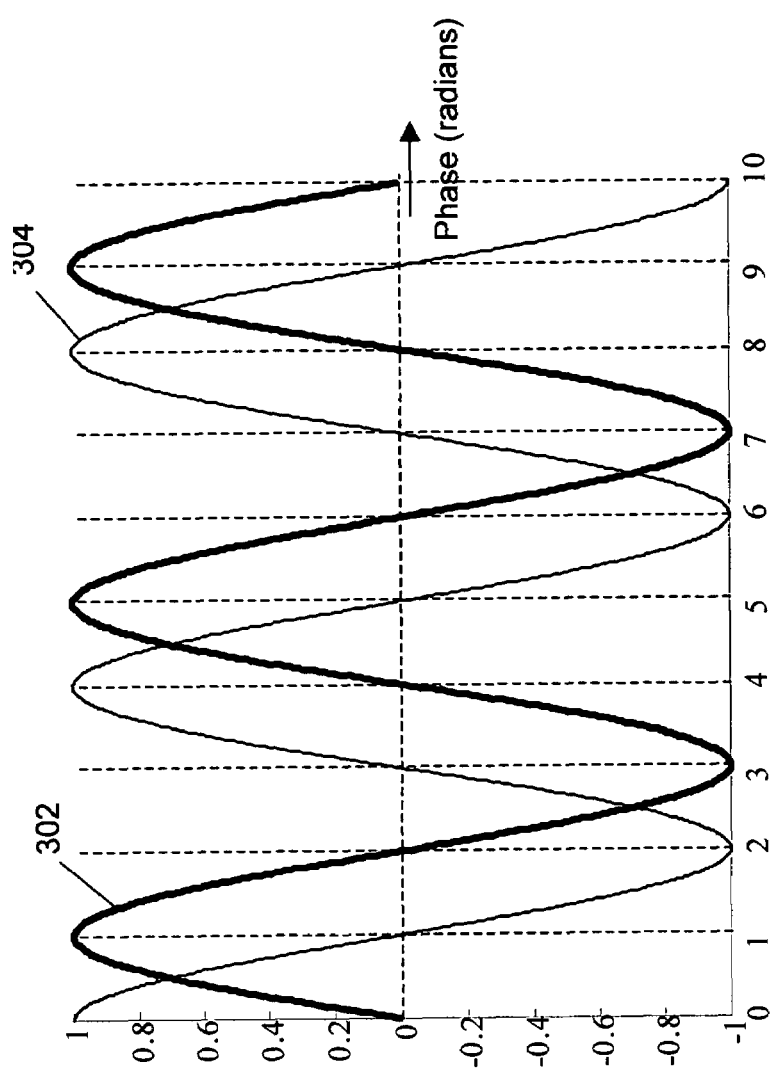
FIG. 3 depicts the in-phase (I) and quadrature-phase (Q) components of a received signal.

The FB is broadcast on a frequency control channel (FCCH) of the received signal. In the base band, the FB is a complex sinusoid. FIG. 3 shows exemplary I- and Q-components of the received signal, which is a complex sinusoid in the absence of a frequency offset between the transmitter and receiver 100 of FIG. 1. The complex sinusoid consists of an I-component 302 and a Q-component 304. The horizontal or x-axis shows the phase of I-component 302 and Q-component 304 in radians. The vertical or y-axis shows the values of I-component 302 and Q-component 304 corresponding to the respective phases.

Mathematically, I-component 302, corresponding to an $n^{th}$ sample, may be represented as:

$$y_i(n) = \cos(\omega n), \quad (1)$$

where $\omega$ is the frequency in radians per sample.

Similarly, Q-component 304, corresponding to an $n^{th}$ sample, may be represented as:

$$y_q(n) = \sin(\omega n) = \cos(\omega n - \pi/2) \quad (2)$$

From (1) and (2), it may be concluded that Q-component 304 is a delayed version of I-component 302. In an exemplary embodiment of the present invention, the rate at which I-component 302 and Q-component 304 are sampled is 271 kHz. In the absence of a frequency offset, the frequency of the complex sinusoid is one-fourth the sampling rate, i.e., 67.75 kHz. Hence, $\omega$ in (1) is equal to $\pi/2$ radians per sample, and one sample in time corresponds to a phase shift of $\pi/2$ radians. In the absence of frequency offset and noise, (1) and (2) above may be related to each other as:

$$y_i(n) = y_q(n+1) \quad (3)$$

Therefore, I-component 302, delayed by one sample, may be highly correlated to the Q-component 304.

Also, both I-component 302 and Q-component 304 repeat themselves with a negative sign after every two samples. In the absence of frequency offset and noise:

$$y_i(n) = -\cos(\omega n + \pi) = -y_i(n+2), \quad (4)$$

Hence, I-component 302 has high correlation with itself, shifted by two samples, but with negative amplitude; and I-component 302 has high correlation with itself, shifted by four samples.

Similarly, Q-component 304 has high correlation with itself, shifted by two samples, but with negative amplitude; and Q-component 304 has high correlation with itself, shifted by four samples.

$$y_q(n) = -\sin(\omega n + \pi) = -y_q(n+2) \quad (5)$$

Equations (3), (4) and (5), may result in the following correlations. The correlation $R_{iq}(1)$ between I-component 302 and Q-component 304, with a shift of one sample, is provided by the following equation:

$$R_{iq}(1) = \sum_{n=0}^{N-1} y_i(n) y_q(n+1) \quad (6)$$

The correlation $R_{ii}(2)$ between I-component 302 and I-component 302, with a shift of two samples, is provided by the following equation:

$$R_{ii}(2) = \sum_{n=0}^{N-1} y_i(n) y_i(n+2) \quad (7)$$

The correlation $R_{qq}(2)$ between Q-component 304 and Q-component 304 with a shift of two samples is provided by the following equation:

$$R_{qq}(2) = \sum_{n=0}^{N-1} y_q(n) y_q(n+2) \quad (8)$$

These correlations, as represented by equations (6), (7) and (8), may have high values when the received signal is a complex sinusoid. In the base band, the FB is a complex sinusoid. The high correlations of the complex sinusoid can be used to distinguish between the FB and other signals. However, in the presence of a frequency offset, the value of the autocorrelation peak is reduced. In general, an $n^{th}$ sample of the received signal may be represented as:

$$z(n) = y_s(n) + w(n) \quad (9)$$

where $y_s(n)$ is a complex sinusoid sample, including both I-component 302 and Q-component 304, while $w(n)$ is the additive white Gaussian noise (AWGN) component of the received signal. Also, $$z(n+k) = y_s(n+k) + w(n+k) \quad (10)$$

where $z(n+k)$ represents the $n^{th}$ sample of the received signal shifted k times, where k is an integer. If k is a positive integer, the shift results in the received signal delayed by k samples of the same.

The above equations (6), (7) and (8) are modified in the presence of a frequency offset due to the fact that a shift of one sample no longer corresponds to $\pi/2$ radians. The effect of the frequency offset reduces the magnitude of correlation.

Figure 4:
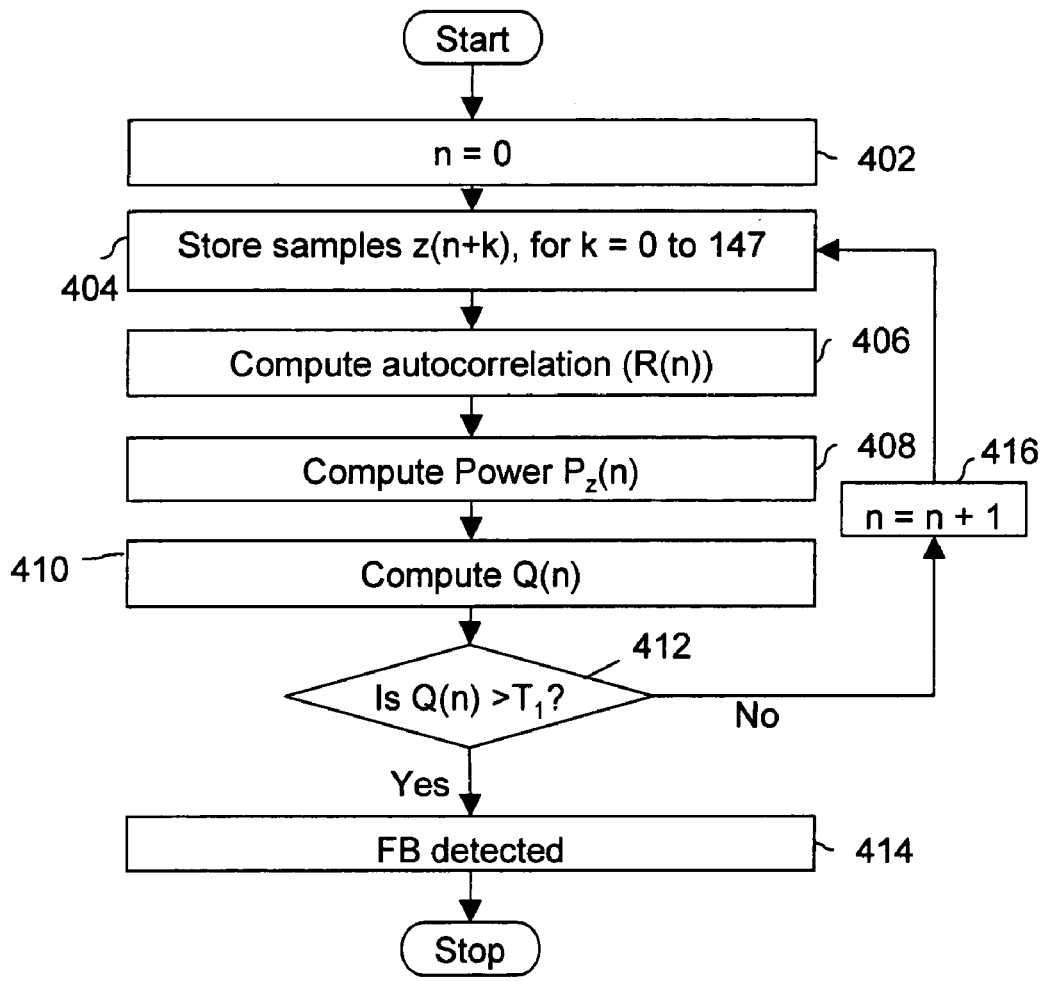
FIG. 4 is a flowchart depicting the steps to detect a frequency burst, in accordance with an exemplary embodiment of the present invention.

Referring back to FIG. 2, detecting a FB at receiver 100 at step 202 includes computing a normalized correlation of a set of samples of the received signal. The FB is detected if the normalized autocorrelation is greater than or equal to a predetermined threshold, which is described in detail below. However, if the normalized autocorrelation is less than a predetermined threshold, the FB is not detected and a normalized autocorrelation is computed again for a next set of samples. The method mentioned above is repeated till the FB is detected. FIG. 4A, FIG. 4B and FIG. 4C are flowcharts depicting the detailed method of the present invention, in accordance with an embodiment of the present invention.

At step 402 in FIG. 4A, an index n is initialized at n=0. At step 404, a set of samples of received signal z(n) is stored as z(n+k), where k varies from k=0 to k=147. In other words, z(n) is stored over a sliding window of size 148, which is the total number of bits of the FB. An autocorrelation R(n) of z(n) is computed over the set of samples at step 406. In an embodiment, R(n) is the autocorrelation of the 148 samples. The averaging over 148 samples makes R(n) almost independent of the AWGN component in the received signal. The autocorrelation R(n) may comprise autocorrelation of the in-phase components of z(n); autocorrelation of the quadrature components of z(n); and autocorrelation between the in-phase components and the quadrature components of z(n) and their combination thereof. For example, the autocorrelation R(n) may also comprise a combination of the autocorrelation of the in-phase components of z(n), the autocorrelation of the quadrature components of z(n), and autocorrelation between the in-phase components and the quadrature components of z(n). Hence, the computation of R(n) may be carried out by making use of equations (6), (7) and (8) individually or their combinations, for example, as represented by the following equation:

$$R = R_{iq}(1) - R_{ii}(2) - R_{qq}(2). \quad (11)$$

At step 408, the total signal power of z(n) is computed as follows:

$$P_z(n) = S(n) + W(n) \quad (12)$$

where S(n) is the power of $y_s(n)$ and W(n) is the power of w(n), as provided in equation (9).

The autocorrelation R(n) is normalized at step 410. The normalized autocorrelation is a ratio provided by $$Q(n) = |R(n)|^2 / (S(n) + W(n))^2 \quad (13)$$

The normalized autocorrelation Q(n) is compared with a predetermined threshold $T_1$ at step 412. In an exemplary embodiment of the present invention, the value of the predetermined threshold $T_1$ may be 0.5 in the absence of the AWGN component in the received signal. However, Q(n) decreases as the noise power increases. Hence, a sufficiently low threshold $T_1$ (<0.5) is considered, to allow the detection of the signal with a low signal to noise ratio (SNR). The FB is detected at step 414 if Q(n) is greater than or equal to $T_1$. However, if Q(n) is less than $T_1$, the FB is not detected and a next sample is considered by incrementing n by 1 in step 416 and repeating steps 404 to 412 over the sliding window at step 404. The process described above is repeated till the FB is detected.

Figure 5:
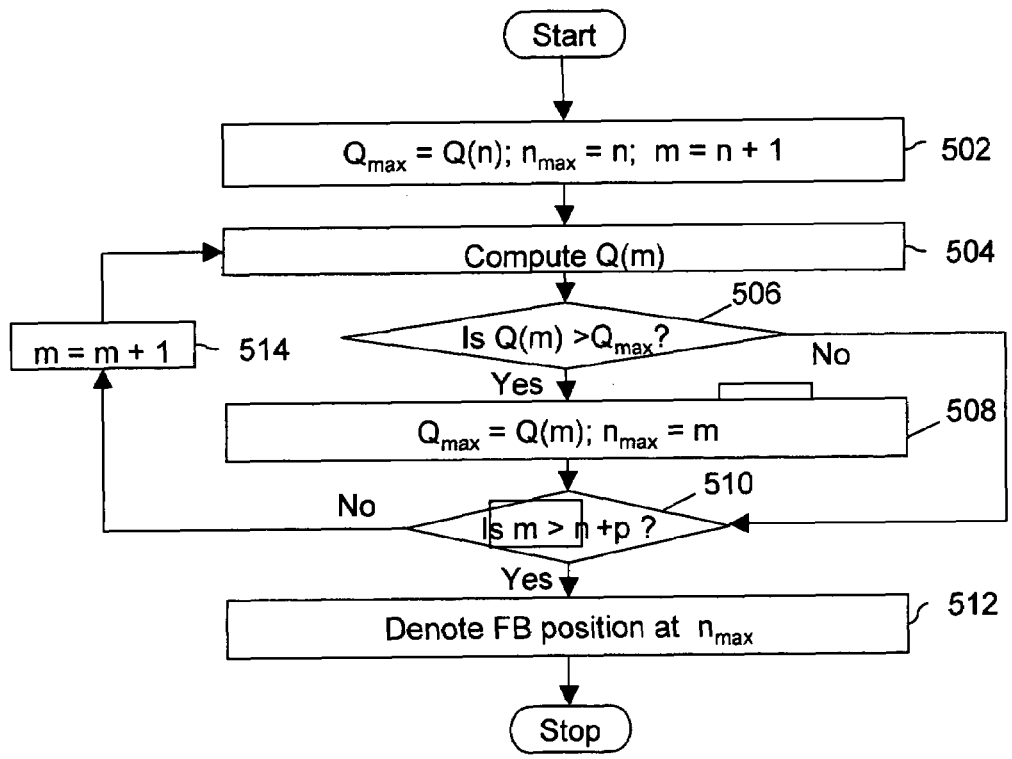
FIG. 5 is a flowchart depicting the steps to identify the position of the detected frequency burst, in accordance with an exemplary embodiment of the invention.

Referring back to FIG. 2, detecting the FB at step 202 also includes determining the position in the bit stream of the detected FB. FIG. 5 depicts the process of determining the position of the detected FB, in an exemplary embodiment of the invention. This is achieved by searching for an index $n_{max}$ in the neighborhood of n (determined in FIG. 4), at which Q(n) is maximum. At step 502, Q(n) is stored as $Q_{max}$. At step 504, a normalized autocorrelation Q(m) is computed for an $m^{th}$ window, where m lies in the neighbourhood of n. At step 506, Q(m) is compared with $Q_{max}$. In case, Q(m) is greater than or equal to $Q_{max}$, the value of Q(m) is stored as $Q_{max}$ and m is stored as $n_{max}$ at step 508. Subsequently, m is compared with a value (n+p) at step 510, where p lies between N/2 and N. In case m is found to be greater than (n+p), then at step 512 m (i.e., $n_{max}$) is denoted as the exact position of the detected FB with autocorrelation $Q_{max}$. However, if m is less than (n+p), m is incremented by 1 at step 514, and the steps 504-510 are repeated. The method is repeated till the exact position of the detected FB is determined.

The method described above may detect any received signal that is periodic, such as the FB. However, other periodic signals may also be falsely detected in the detection method described above. To eliminate such falsely detected FBs, and to reduce false detection at low SNRs, the detected FB is validated. The detected FB is validated by using the synchronization burst (SB). The validation of the detected FB comprises estimating an SB on the basis of the detected FB and validating the estimated SB. The transmitter broadcasts the SB periodically, together with the FB. In a GSM system, the SB carries information in the form of encoded bits related to system timing and transmitter identity, and a training sequence of 64 bits. The training sequence carries the information needed to demodulate the information transmitted by the transmitter to receiver 100, shown in FIG. 1. The SB is estimated on the basis of its position.

The position of the SB may be estimated by using the position of the FB determined by the method described in conjunction with FIG. 5. The position of the FB detected above is used to identify the frame of the detected FB. The bits corresponding to the estimated position of the SB are one frame away from the position of FB. Subsequently, these bits are identified by using a correlation with the known training sequence, resulting in the SB estimation. An exemplary method for validation of the estimated SB is depicted in FIG. 6.

Figure 6:
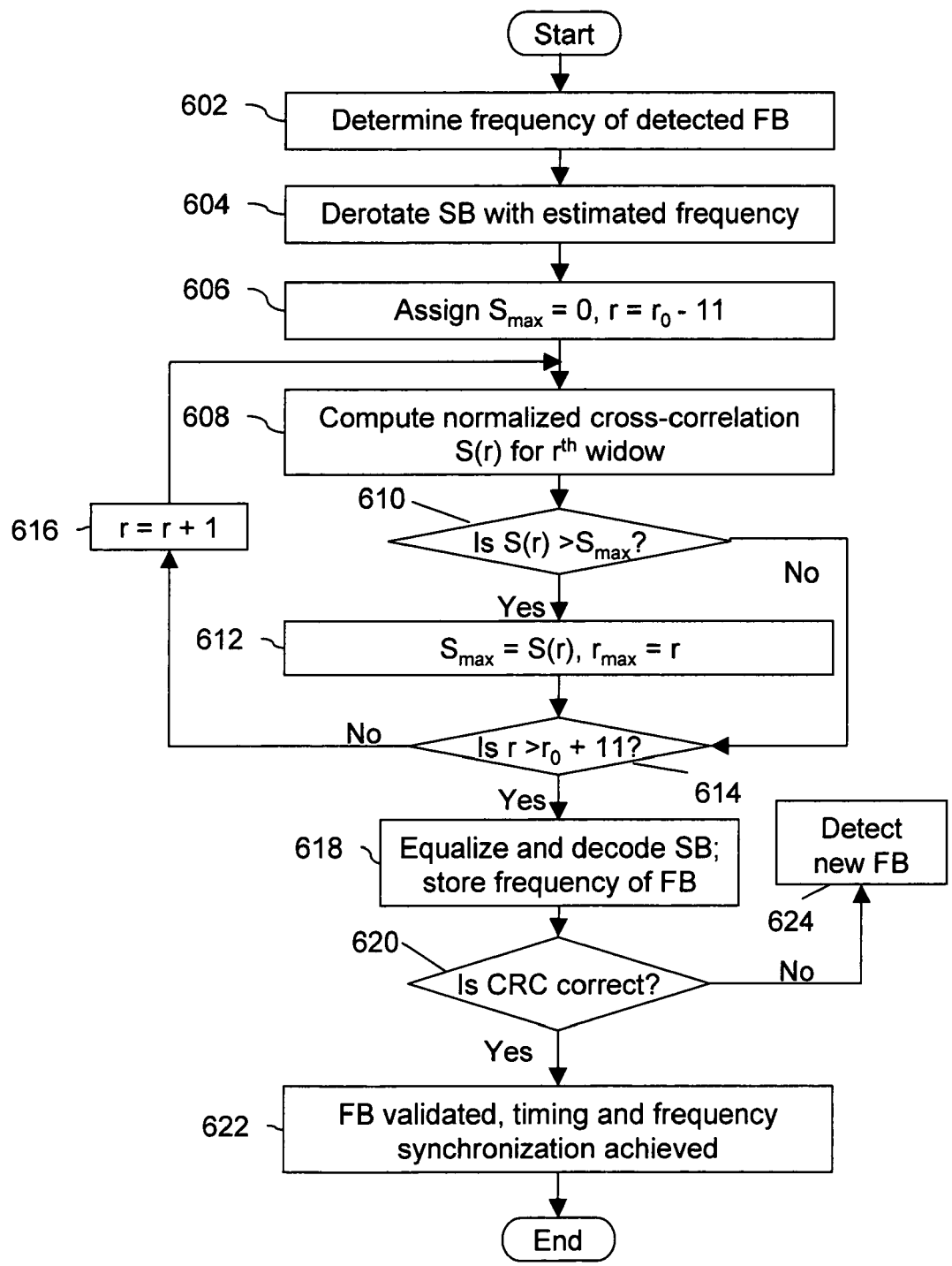
FIG. 6 is a flowchart depicting the steps to validate the frequency burst, in accordance with an embodiment of the present invention.

FIG. 6 is a flowchart depicting the steps to validate the FB based on validation of the estimated SB, in accordance with an embodiment of the present invention. At step 602 the frequency of the detected FB is determined by performing a fast Fourier transform (FFT) on the detected FB (based on FIG. 4 and FIG. 5). In a further embodiment, a 128-point FFT is performed to determine the frequency of the detected FB. It may be noted that the determination of the frequency by performing an FFT, for example, 128-point FFT, is well known in the art. The estimated SB is then derotated at step 604 by using the frequency of the detected FB. Derotation is performed to eliminate the effect of GMSK modulation and frequency offset, if there is any. Derotation can be performed by processes well known in the art.

Cross-correlations with the known training sequence are used to get the precise position of the SB. Complex correlations are computed over a window of suitable size, and the position at which the correlation is maximum is considered to be the precise position of the SB. At step 606, a correlation $S_{max}$ is initialized at zero. The correlation of the SB begins at $r_0-11$. $r_0$ is the position at which the estimated SB training sequence begins. In an exemplary embodiment, the position of $r_0$ is given by $r_0 = n_{max} + 1292$ bits, where $n_{max}$ is the position of the detected FB. At step 608, a cross-correlation S(r) corresponding to an $r^{th}$ window of the derotated SB with a predetermined signal, is computed. The cross-correlation S(r) is computed in a manner, which is similar to the computation of the autocorrelation R(n), described earlier. In an embodiment of the present invention, the 64 bits corresponding to a training sequence for the SB are cross-correlated with the predetermined signal over a window of size 64, sliding over a length of, for example, 23 samples.

In an exemplary embodiment of the present invention, the predetermined signal is the previously known 64-bit training sequence. The position, at which S(r) is maximum, is obtained as follows. S(r) is compared with $S_{max}$ at step 610. In case, S(r) is greater than or equal to $S_{max}$, the value of S(r) is stored as $S_{max}$ and r is stored as $r_{max}$ at step 612. Subsequently, r is compared with $r_0 + 11$ at step 614. In case, r is found to be greater than or equal to $r_0 + 11$ (i.e., when all the 23 samples mentioned above have been considered), the estimated SB is further processed in steps 618-622 for validation. In other words, the estimated SB is validated for a sample for which the correlation with the predetermined signal is the maximum. The validation of the SB implies the validation of the FB, since the SB is validated based on the estimated frequency and position corresponding to the estimated FB. However, if r is found to be less than $r_0 + 11$, r is incremented by unity at 616, and steps 608-614 are repeated.

Referring back to FIG. 2, after validation of the FB, the frequency and timing information required for synchronization is acquired at step 206. Acquiring the frequency and timing information includes identifying the frequency of the validated FB, equalizing the validated SB, and acquiring the timing information corresponding to the transmitter by decoding the equalized SB. This is depicted at step 618. At step 618, the frequency information of the FB is acquired by identifying the frequency of the validated FB previously determined at step 602. This frequency is also used to equalize and decode the estimated SB. $r_{max}$ indicates the position of the maximum value of correlation $S_{max}$. The position $r_{max}$ indicates the timing of the SB. The position $r_{max}$ corresponds to the timing of the beginning of the SB training sequence. The value of the correlation is maximum at this point. The validated SB is equalized by using the channel estimates, which is obtained through correlations S(r) corresponding to the validated SB, and neighboring correlations. The computation of channel estimates based on correlations is well known in the art. After equalization, bits of the estimated SB, other than those of the training sequence, are decoded to obtain system timing and transmitter identity. It is to be noted that the process of obtaining the system timing and transmitter identity, based on the identified SB, is known in the art.

The decoded bits of estimated SB are checked for correctness using a cyclic redundancy check (CRC) at step 620. The estimated SB includes 10 CRC bits. If the estimated SB is decoded correctly, the CRC yields the 10 bits correctly. However, if the bits are found to be incorrect, the estimated SB is not validated. If the result of the CRC is correct, then the timing and frequency synchronization is established at step 622. However, if the result of the CRC is not correct, a new FB is detected at step 624 by using the process described in conjunction with FIG. 4 and FIG. 5. This means that a next set of samples of the received signal z(n+k) is stored for detection and validation of the new FB. The process is repeated till a FB is validated, i.e., until the frequency and time synchronization between the transmitter and receiver 100 is achieved.

Figure 7:
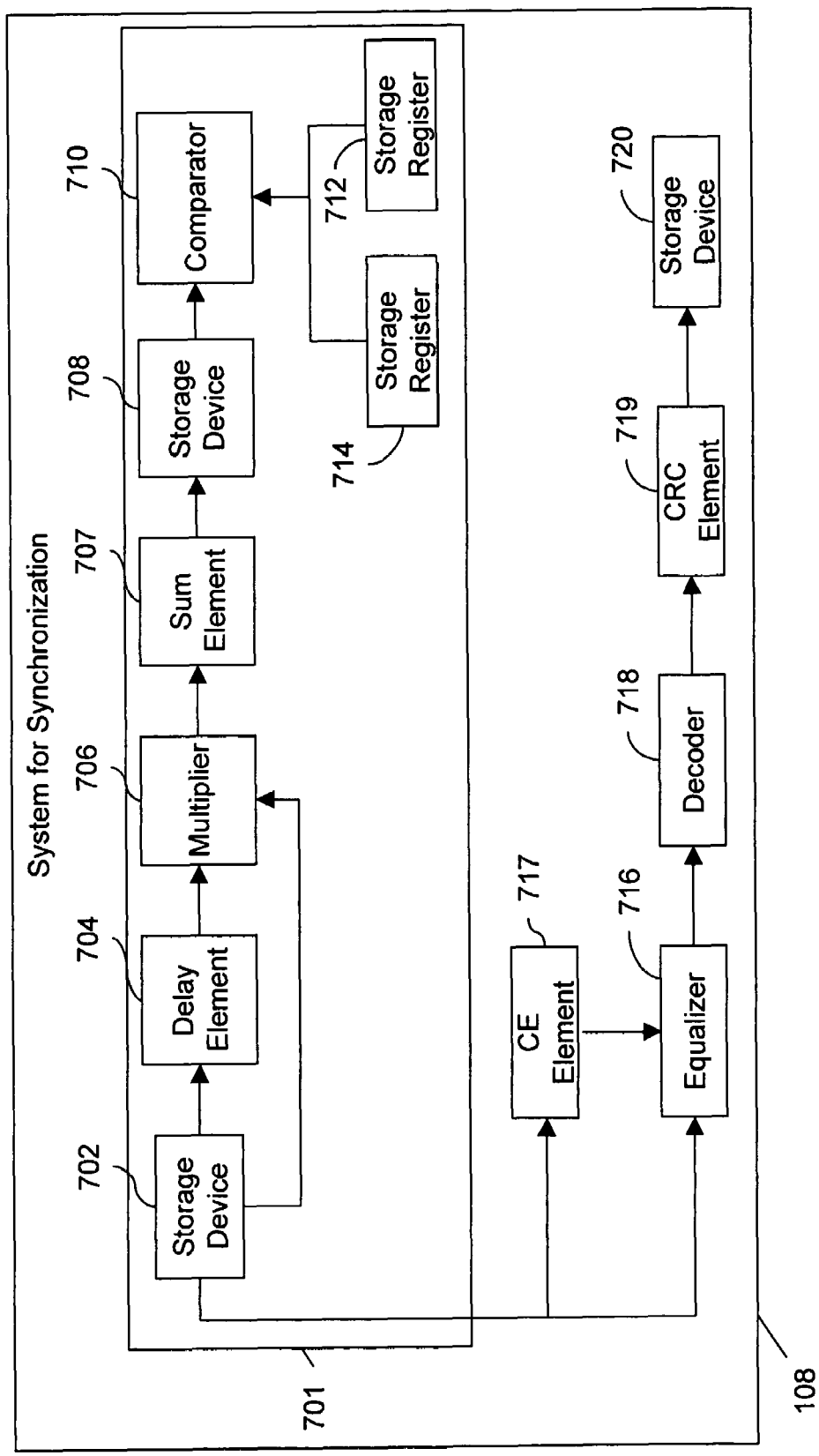
FIG. 7 illustrates the essential components of a system for synchronization, in accordance with an embodiment of the present invention.

The method described above may be implemented by system 108, depicted in FIG. 1, according to an embodiment of the present invention. FIG. 7 illustrates the essential components of system 108, according to an embodiment of the present invention. System 108 includes a means for detecting the FB at receiver 100 and validating the detected FB based on the SB. It is to be noted that the means for detecting and validating the FB may have a similar structure. FIG. 7 illustrates a block 701, which is the means for detecting and validating the FB. Block 701 includes a storage device 702 for storing the set of samples of the received signal and other data. A delay element 704 may introduce a delay in a sample from amongst the set of samples of the received signal. A multiplier 706 multiplies a sample with its delayed sample. A sum element 707 sums up these multiplied samples over a window of a predetermined size for computing the autocorrelation. The values of such autocorrelations are stored in a storage device 708. Storage device 708 may also store the validated FB and the validated SB. Storage devices 702 and 708 may include, but are not limited to, a first in first out (FIFO) storage device, a last in first out (LIFO) storage device, and other storage devices. The autocorrelation values are compared with a predetermined threshold by a comparator 710. Comparator 710 may be implemented by using any standard comparator circuit known in the art. The predetermined threshold may be stored in storage register 712. Another storage register 714 stores the position of the sample corresponding to the autocorrelation.

System 108 further includes means for acquiring frequency and timing information for synchronization with the transmitter, based on the validated FB. Means for acquiring frequency and timing information may include an equalizer 716 for equalizing the validated SB, a channel estimation (CE) block 517 for providing the channel estimates to equalizer 716, and a decoder 718 for decoding the equalized SB to acquire the timing information corresponding to the transmitter. Additionally, there may be a CRC block 719 for checking the correctness of the decoded bits of the SB and a storage device 720 for storing the frequency of the validated FB and the timing information of the decoded SB. Equalizer 716 can be either a non-adaptive or an adaptive equalization circuit in various embodiments of the invention.

Each of the system elements such as comparator 710, equalizer 716, CE block 717, decoder 718, and CRC block 719 may be implemented on an integrated circuit, such as field programmable gate arrays, and application specific integrated circuits. Storage devices may be implemented by using FIFO.

The method and system of the present invention have the advantage that both the frequency and timing information carried by the received signal are available simultaneously at receiver 100. In an exemplary embodiment of the present invention, the maximum time taken to achieve frequency and time synchronization may be about 55 ms, which is approximately half the time required if the methods for FB detection, frequency correction and SB detection are used separately. The derotation of SB samples may also be carried out in the digital domain. This reduces the need to adjust the system timing or clock before validating the FB.

The method of the present invention makes use of one or more correlations provided in equations (6), (7), (8), and (11). In an embodiment of the present invention, different combinations of equations (6), (7), (8) may be used depending on the computational complexity of the method. In an embodiment of the present invention, using equation (11) for determining correlations provides better results than using equations (6), (7), or (8) individually. This is because using equation (11) may result in a higher averaging of noise than using equations (6), (7), or (8) individually.

In one embodiment of the present invention, the range of frequencies the method can detect in the absence of noise may be in the range of $\omega \pm \omega/4$ Hz. In an exemplary embodiment of the present invention, frequencies may be detected in the range of $67.75 \pm 16.8$ kHz.

In one embodiment of the present invention, the detection process may begin after reducing the frequency offsets to a predetermined limit. In such a case, the range of frequencies for detection may be wider than the range of $\omega \pm \omega/4$ Hz. Such a case may occur for devices capable of operating in multiple technologies. In an exemplary embodiment of the present invention, the range of frequencies that may be detected may be wider than the range of $\omega \pm \omega/4$ Hz when a device operating in a different radio technology synchronizes with a GSM system.

The method of the present invention may be implemented by using simple hardware components. In an embodiment of the present invention, the hardware may be a part of a device supporting multiple technologies. The hardware implementation allows independent running of the algorithm corresponding to the method of the present invention. This helps the device in identifying the GSM system while it may operate in a technology other than GSM.

The present invention may also be implemented in software. Any suitable programming language or other tools may be utilized, such as variants of JAVA, C variants (for example, C++, C#) or other programming languages, in accordance with the requirements of a particular application.

The system, as described in the present invention or any of its components, may be embodied in the form of a computing system. Typical examples of a computing system includes a programmed microprocessor, a micro-controller, a peripheral integrated circuit element, and other devices or arrangements of devices that are capable of implementing the steps constituting the method of the present invention.

The computing system comprises a processing system, an input device, a display unit and a communication interface. The processing system comprises a microprocessor. The microprocessor is connected to a communication bus. The computing system also includes a memory. The memory may include Random Access Memory (RAM) and Read Only Memory (ROM). The computing system further comprises a storage device, which can be a FIFO, LIFO or other storage devices. The storage device can also include other means of loading programs or other instructions into the computing system.

The computing system executes a set of instructions that are stored in one or more storage elements, in order to process input data. The storage elements may also hold data or other information, as desired, and may be in the form of an information source or a physical memory element present in the processing system.

The set of instructions may include various commands that instruct the processing system to perform specific tasks such as the steps that constitute the method of the present invention. The set of instructions may be in the form of a software program. The software may be in various forms such as system software or application software. Further, the software may be in the form of a collection of separate programs, a program module with a larger program or a portion of a program module. The software might also include modular programming in the form of object-oriented programming. The processing of input data by the processing machine may be in response to user commands, or results of previous processing, or in response to a request made by another processing machine the present invention may also be embodied in computer program product for use with a computer. The computer program product includes a computer readable medium having a computer readable program code written thereon.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for improving a frequency burst detection algorithm at a receiver, the frequency burst being used to synchronize a transmitter and the receiver in a communication system, wherein the receiver receives a plurality of signals from the transmitter, said signals including the frequency burst and a synchronization burst, the method comprising the steps of: a. detecting the frequency burst at the receiver, wherein detecting the frequency burst comprises the steps of: i) computing a normalized correlation of a set of samples of a received signal at the receiver, wherein the normalized correlation comprises at least one of a normalized autocorrelation of in-phase components of the set of samples, a normalized autocorrelation of quadrature components of the set of samples, and a normalized correlation between the in-phase components and the quadrature components of the set of samples; if the normalized correlation is greater than a predetermined threshold, ii) detecting the frequency burst; iii) acquiring frequency and timing information from the detected frequency burst; iv) estimating the synchronization burst from amongst the plurality of signals received from the transmitter, the estimate being based on the acquired frequency and timing information; v) performing a procedure for validating the estimated synchronization burst; vi) acquiring synchronization with the transmitter if the synchronization burst is validated; and else a) discarding the detected frequency burst and repeating i to vi over a next set of samples; else vii) repeating i to vi over a next set of samples.

2. The method according to claim 1, wherein the step of detecting the frequency burst at the receiver further comprises the step of determining the position of the detected frequency burst in the received signal.

3. The method according to claim 1, wherein the procedure for validating the estimated synchronization burst comprises the steps of:
   a. derotating the synchronization burst by using the frequency of the detected frequency burst;
   b. finding the precise position of the estimated synchronization burst by computing the correlation of the derotated synchronization burst with a predetermined signal;
   c. performing a check on the estimated synchronization burst, based on decoding and cyclic redundancy check; and
   d. validating the synchronization burst if the check is correct.

4. The method according to claim 1, wherein the step of determining the frequency of the detected frequency burst comprises performing a fast Fourier transform on the detected frequency burst.

5. The method according to claim 3, wherein that estimated synchronization burst is validated for which the correlation with the predetermined signal is maximum.

6. The method according to claim 1, wherein the step of acquiring synchronization between the transmitter and the receiver comprises the steps of:
   a. identifying the frequency of the validated detected frequency burst;
   b. equalizing the validated synchronization burst; and
   c. acquiring the timing information corresponding to the transmitter by decoding the equalized synchronization burst.

7. A method as recited in claim 1 further comprising computing the normalized autocorrelation of in-phase components based on equation $$R_{ii}(2) = \sum_{n=0}^{N-1} y_i(n) y_i(n+2),$$

where y represents the received signal, the index 'i' indicates the in-phase component, and the argument of the function represents time.

8. A method as recited in claim 1 further comprising computing the normalized autocorrelation of quadrature components based on equation $$R_{qq}(2) = \sum_{n=0}^{N-1} y_q(n) y_q(n+2)$$

where y represents the received signal, the index 'q' indicates the quadrature component, and the argument of the function represents time.

9. A method as recited in claim 1 further comprising computing the normalized correlation between the in-phase and quadrature components based on equation $$R_{iq}(1) = \sum_{n=0}^{N-1} y_i(n) y_q(n+1),$$

where y represents the received signal, the index 'i' indicates the in-phase component, the index 'q' indicates the quadrature component, and the argument of the function represents time.

10. A system for improving a frequency burst detection algorithm at a receiver, the frequency burst being used to synchronize a transmitter and the receiver in a communication system, wherein the receiver receives a plurality of signals from the transmitter, said signals including the frequency burst and a synchronization burst, the system comprising: a. means for detecting the frequency burst at the receiver, wherein the means for detecting the frequency burst comprising; i. a sum element for computing a normalized correlation of a set of samples of a received signal at the receiver, wherein the normalized correlation comprises at least one of a normalized autocorrelation of in-phase components of the set of samples, a normalized autocorrelation of quadrature components of the set of samples, and a normalized correlation between the in-phase components and the quadrature components of the set of samples, wherein the frequency burst is detected if the normalized correlation is greater than the predetermined threshold else detecting a new frequency burst over the next set of samples; b. means for acquiring frequency and timing information from the detected frequency burst; c. means for estimating the synchronization burst from amongst the plurality of signals received from the transmitter, the estimate being based on the acquired frequency and timing information; d. means for performing a procedure for validating the estimated synchronization burst; e. means for checking the validity of the synchronization burst, wherein the frequency burst is discarded if the synchronization burst is not validated; and f. means for acquiring frequency and timing information for synchronization with the transmitter, based on the validated synchronization burst.

11. A computer program product, written on a computer readable medium for use with a computer having a processor, for improving a frequency burst detection algorithm at a receiver, the frequency burst being used to synchronize a transmitter and the receiver in a communication system, wherein the receiver receives a plurality of signals from the transmitter, said signals including the frequency burst and a synchronization burst, the system comprising: a. program instruction means for detecting the frequency burst at the receiver, wherein the means for detecting the frequency burst comprising; i. a sum element for computing a normalized correlation of a set of samples of a received signal at the receiver, wherein the normalized correlation comprises at least one of a normalized autocorrelation of in-phase components of the set of samples, a normalized autocorrelation of quadrature components of the set of samples, and a normalized correlation between the in-phase components and the quadrature components of the set of samples; wherein the frequency burst is detected if the normalized correlation is greater than the predetermined threshold else detecting a new frequency burst over the next set of samples; b. program instruction means for acquiring frequency and timing information from the detected frequency burst; c. program instruction means for estimating the synchronization burst from amongst the plurality of signals received from the transmitter, the estimate being based on the acquired frequency and timing information d. program instruction means for performing a procedure for validating the estimated synchronization burst; e. program instruction means for checking the validity of the synchronization burst, wherein the frequency burst is discarded if the synchronization burst is not validated; and f. program instruction means for acquiring frequency and timing information for synchronization with the transmitter, based on the validated synchronization burst.

* * * * *